United States Patent [19]
Ohsato et al.

[11] 3,718,450
[45] Feb. 27, 1973

[54] FLOAT PROCESS FOR MANUFACTURE OF GLASS RIBBON

[75] Inventors: Nobuyoshi Ohsato; Naotomo Akashi, both of Maizuru, Japan

[73] Assignee: Nippon Sheet Glass Co., Osaka, Japan

[22] Filed: Oct. 14, 1970

[21] Appl. No.: 80,686

[30] Foreign Application Priority Data

Oct. 15, 1969 Japan..........................44/82 728

[52] U.S. Cl. ..............................65/99 A, 65/182 R
[51] Int. Cl. ...........................................C03b 18/00
[58] Field of Search ......................65/65, 99 A, 182 R

[56] References Cited

UNITED STATES PATENTS 3,440,030  4/1969  Thompson et al.....................65/99 A
3,459,523  8/1969  Atkeson ................................65/99 A Primary Examiner—Robert L. Lindsay, Jr.
Attorney—Wenderoth, Lind & Ponack

[57] ABSTRACT

An improvement in the float process for the manufacture of glass ribbon having a thickness different from the equilibrium thickness, said improvement being characterized in that jets of molten metal are impinged against both side edge portions of the glass ribbon from nozzles disposed below the glass ribbon and in the molten metal bath, and a lateral stretching force, in the case of outward impinging, or a lateral contracting force, in the case of inward impinging, is imparted to the glass ribbon by the momentum of the molten metal impinged from the nozzles against the glass ribbon.

8 Claims, 6 Drawing Figures

NOBUYOSHI OHSATO and
NAOTOMO AKASHI, Inventors

BY Wenderoth, Lind & Ponack
Attorneys

FLOAT PROCESS FOR MANUFACTURE OF GLASS RIBBON

This invention relates to a process for the continuous preparation of glass ribbon by introducing molten glass onto a bath of molten metal, forwarding it over the bath and cooling and solidifying the same. More practically, this invention relates to an improvement of the above process of the continuous preparation of glass ribbon, whereby glass ribbon products having a thickness different from the equilibrium thickness can be manufactured advantageously.

In the continuous preparation of glass ribbon by introducing molten glass onto a bath of molten metal at a prescribed rate and forwarding it over the bath in the form of a ribbon at a prescribed forwarding rate, there is formed a product having an equilibrium thickness determined by factors such as the temperature of molten glass to be introduced onto the bath and the forwarding rate of the glass ribbon. Glass ribbon having a thickness different from the equilibrium thickness may be prepared by a method comprising adjusting the temperature of glass ribbon on the bath, the forwarding rate of glass ribbon and the like, but where a glass ribbon product having a sufficient width is to be prepared under stable operation conditions, the above-mentioned temperature and forwarding rate must be maintained within certain ranges. Accordingly, in such a method it is difficult to prepare glass ribbon having a thickness considerably different from the equilibrium thickness.

For the preparation of glass ribbon having a thickness greater than the equilibrium thickness, there has been heretofore adopted a process in which the expansion of molten glass ribbon having a tendency to expand freely on the bath of molten metal is restricted by width-restricting members provided on both sides of the glass ribbon and it is forwarded in this state and cooled and solidified. For the preparation of glass ribbon having a thickness smaller than the equilibrium thickness there has been proposed a process comprising contacting rotary members or the like with both side edges of glass ribbon advancing on the bath, thereby imparting to the glass ribbon a force directed outwardly with respect to the lateral direction of the glass ribbon, thus stretching the glass ribbon and reducing the thickness thereof. In this process using rotary members or the like, however, it is necessary to provide a power-transferring mechanism for rotation of rotary members or a complicated speed-adjusting mechanism. Further, this process is defective in that since rotary members are directly contacted with the advancing glass ribbon, at high temperature areas glass adheres easily to these members, which will result in defects on the surface of the product glass ribbon.

Recently, the specification of U.S. Pat. No. 3,440,030 proposed a process for the preparation of glass ribbon having a thickness smaller than the equilibrium thickness which comprises laterally stretching glass ribbon by impinging jets of gas against both side edges of the glass ribbon outwardly with respect to the longitudinal direction from nozzles provided over both edges of the glass ribbon flowing onto the bath of molten metal and advancing over the bath. This process is unique in that a direct mechanical contact of width-restricting means with the molten glass ribbon can be avoided. However, since the momentum of the impinging gas is small, the gas must be impinged at a high pressure and velocity, and the effect of laterally stretching the glass ribbon attained by impingement of the gas is not so pronounced.

The specification of U.S. Pat. No. 3,459,523 discloses a process for the preparation of flat glass ribbon having a thickness different from the equilibrium thickness which comprises applying a force to a bath of molten metal so that two different liquid levels adjoining each other will be formed in the molten metal bath supporting the molten glass ribbon. In this process, however, it is necessary to provide a special device for adjusting the level of the molten metal and this process is also defective in that in order to form different liquid levels in the portion supporting the glass ribbon and other portions, a great force is required for shifting the molten metal having a great specific gravity.

A primary object of this invention is to provide an improved process for the preparation of glass ribbon having a thickness different from the equilibrium thickness, according to which glass ribbon products having a thickness different from the eqiulibrium thickness can be easily and advantageously prepared while preventing molten glass ribbon from coming into a direct contact with a substance other than molten metal or width restricting means and maintaining the surface of the molten metal bath at substantially the same level.

In accordance with this invention there is provided an improvement of the float process for the manufacture of glass ribbon having a thickness different from the equilibrium thickness, comprising flowing molten glass onto a bath of molten metal, forwarding the glass over the bath in the form of a continuous ribbon, impinging laterally inwardly or outwardly directed jets of fluid against both side edge portions of the glass ribbon while the glass ribbon advancing on the bath is still in the plasticized state, cooling and solidifying the glass ribbon, and withdrawing the solidified glass ribbon from the bath; said improvement being characterized in that jets of molten metal are impinged against both side edge portions of the glass ribbon from nozzles disposed below the glass ribbon and in the molten metal bath and a lateral stretching or contracting force is imparted to the glass ribbon by the momentum of the molten metal impinged from nozzles against the side edge portions of the glass ribbon.

In the present specification, by the term "equilibrium thickness" is meant a thickness of glass ribbon which is withdrawn from the bath of molten metal when molten glass is introduced onto the bath of molten metal, allowed to expand freely on the molten metal bath under influences of its own gravity and surface tension, cooled while it advances over the bath and withdrawn at a constant rate. In general, the equilibrium thickness is about 6.8 mm.

The nozzle to be used for impinging molten metal in the process of this invention is composed of a refractory material or carbon which is not damaged by molten metal. As the molten metal contained in the bath there may be used any metals having a specific gravity greater than that of glass and which are liquid at temperatures causing the solidification of molten glass. For instance, tin and tin alloy conventionally used in the art may be also used in the process of this invention. It is advantageous to use the molten metal circulated in the bath as the molten metal to be impinged from nozzles against the side edges of glass ribbon. The molten metal pressurized by a compressor is impinged against the side edge portions of glass ribbon from beneath the glass ribbon while it is still in the plasticized state. The direction of the jet of the molten metal projected from the nozzle is directed outwardly or inwardly in the lateral direction of the glass ribbon, whereby the momentum of the impinged molten metal is imparted to the side edges of the glass ribbon and the width of the glass ribbon is stretched or contracted. Thus the thickness of the glass ribbon can freely be made larger or smaller.

In case glass ribbon having a thickness smaller than the equilibrium thickness is prepared in accordance with this invention, while molten glass flown onto the bath of molten metal at a prescribed rate expands and advances over the bath in the form of a ribbon of a certain thickness and it is still in the plasticized state, jets of molten metal are impinged against the lower surface of the glass ribbon at the side edge portions outwardly in the widthwise direction of the glass ribbon in a direction which is almost perpendicular to the direction of the advance of the glass ribbon, from nozzles disposed in the bath of molten metal. The thus impinged jets of molten metal impart an outward stretching force to the glass ribbon, with the result that the glass ribbon is laterally stretched.

Thus, in accordance with one embodiment of this invention, there is provided an improvement of the process for the preparation of glass ribbon comprising flowing molten glass onto a bath of molten metal, forwarding the glass over the bath in the form of a continuous ribbon, cooling and solidifying the glass ribbon and withdrawing the solidified glass ribbon from the bath; said improvement comprising impinging jets of molten metal against both side edge portions of the glass ribbon outwardly in the lateral direction of the glass ribbon from nozzles disposed below the glass ribbon and in the molten metal bath while the glass ribbon is still in the plasticized state, imparting a lateral stretching force to the glass ribbon by the momentum of the molten metal impinged from nozzles against the side edge portions of the glass ribbon and thereby forming a glass ribbon having a thickness smaller than the equilibrium thickness.

In case the preparation of a glass ribbon having a thickness greater than the equilibrium thickness is to be carried out, the impinging of molten metal jets is effected in a manner such that the direction of the jet of the molten metal projected from the nozzle is directed inwardly in the widthwise direction of the glass ribbon, whereby the inward momentum of the molten metal is imparted to the side edges of the molten glass ribbon introduced onto the molten metal bath and the expansion of molten glass is restricted to obtain a desired greater thickness of the glass ribbon.

Thus, in accordance with another embodiment of this invention, there is provided an improvement of the process for the preparation of glass ribbon comprising flowing molten glass onto a bath of molten metal, forwarding the glass over the bath in the form of a continuous ribbon, cooling and solidifying the glass ribbon and withdrawing the solidified glass from the bath; said improvement comprising impinging jets of molten metal against both side edge portions of the glass ribbon inwardly in the lateral direction of the glass ribbon from nozzles disposed below the glass ribbon and in the molten metal bath while the glass ribbon is still in the plasticized state, imparting a lateral contracting force to the glass ribbon by the momentum of the molten metal impinged from nozzles against the side edge portions of the glass ribbon and thereby forming a glass ribbon having a thickness greater than the equilibrium thickness.

At least one pair of nozzles are disposed at the side edge portions of the glass ribbon in a manner such that the pairing nozzles may confront each other. The impinging opening of the nozzle may be an ordinary hole, but it is possible to use a nozzle having a slitted impinging opening. The force imposed on the lower surface of the glass ribbon at the side edge portions is determined by the pressure of the molten metal to be impinged, the number of nozzles provided and the nozzle configuration.

For a better illustration of the invention, a description will now be given with reference to accompanying drawings in which.

Figure 6:
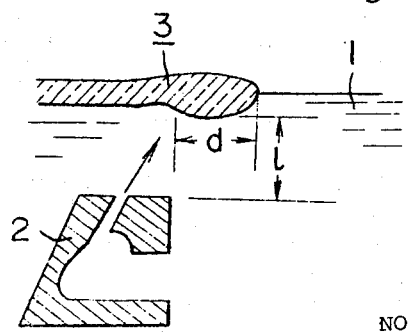
FIG. 6 is a view similar to FIG. 3 explaining the corelation of positions between the molten metal-impinging nozzle and the glass ribbon in the case of the preparation of glass ribbon having a thickness smaller than the equilibrium thickness.

In this invention it is preferable to effect the impingement of molten metal in a manner such that the distance $d$ (in FIG. 6) between the side edge of the glass ribbon and the point at which an extension line of the direction of the jet of the molten metal projected from the nozzle intersects the glass ribbon is in the range of 100–200 mm when preparing a glass ribbon having a thickness smaller than the equilibrium thickness and in the range of 50–200 mm when preparing a glass ribbon having a thickness greater than the equilibrium thickness, and that the length $l$ (in FIG. 6) between the top end of the nozzle and the lower surface of the glass ribbon will be in the range of 5–20 mm.

When the glass ribbon is stretched, it is preferable that the direction of the jet of molten metal projected from the nozzle be at an angle of 15°–80° with respect to the stretching direction (laterally outwardly), and when the width of the glass ribbon is contracted, the said direction be at an angle of 15°–80° with respect to the contracting direction (laterally inwardly). In general, the diameter of the nozzle is in the range of 0.5–2 mm.

The amount impinged of molten metal varies depending on the distance between the top end of the nozzle and the lower surface of the glass ribbon, but it is generally in the range of 1,000–10,000 grams per minute per nozzle. The impinging pressure of molten metal is usually in the range of 1–10 kg/cm². Namely, the molten metal to be impinged is pressurized to 1–10 kg/cm². The temperature of molten metal impinged from the nozzle is not critical and it may be the same as the temperature of molten metal in the bath, for instance, 900°–1,000° C.

According to this invention, jets of molten metal are impinged against the side edge portions of the glass ribbon while it advances over the molten metal bath and is still in the plasticized state. During this operation, the temperature of the glass ribbon is usually maintained at 900°–1,000° C.

This invention will now be described with reference to embodiments illustrated in the accompany drawings.

Figure 1:
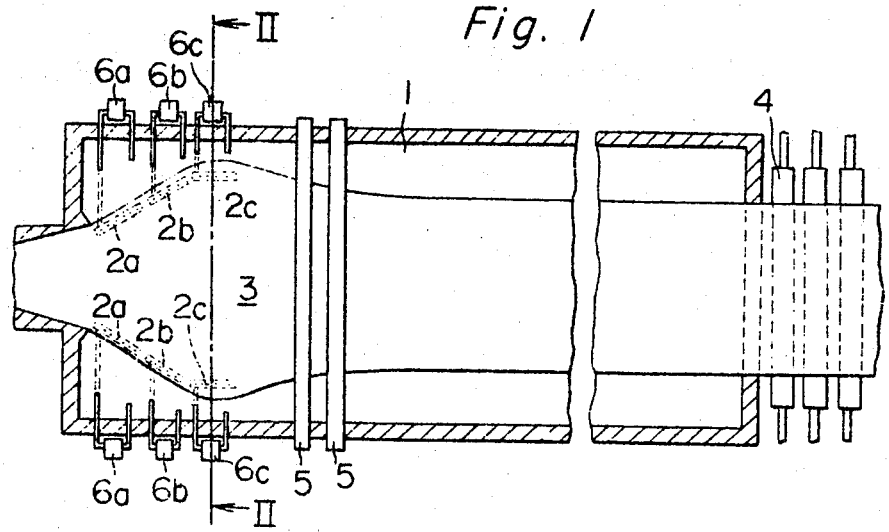
FIG. 1 is a plan view illustrating one embodiment of this invention.
Figure 2:
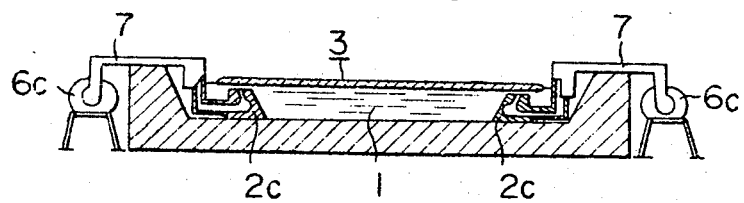
FIG. 2 is a horizontal section taken along the line A-A' of FIG. 1.
Figure 3:
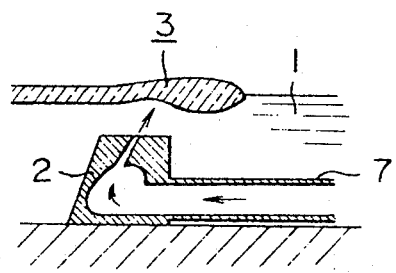
FIG. 3 is a partially enlarged, cross-sectional view illustrating the state where the side edges of the glass ribbon are laterally stretched.

FIGS. 1 to 3 illustrate an embodiment where a glass ribbon having a thickness smaller than the equilibrium thickness is produced. Glass melted in a melting furnace (not shown) is introduced onto bath 1 of molten tin at a controlled rate and expands on bath 1 in the form of a continuous ribbon. While the molten glass is still in a plasticized state, jets of molten metal maintained at about 950° C. are impinged laterally outwardly against the lower surface of the glass ribbon 3 having a temperature of 900°–1,000° C. at the side edge portions thereof from nozzles 2 disposed in bath 1, as is shown in FIG. 3, and thus a lateral stretching force is imparted to the glass ribbon and the width of the glass ribbon is stretched.

Conditions under which the jets of the molten metal are operated in the above embodiments are as follows:

$d$ = 100 mm, $l$ = 10 mm, angle of the jet of the molten metal projected = 45° (laterally outwardly), temperature of the molten metal impinged = 950° C., amount impinged of the molten metal jetted = 4,000 g/min per nozzle, impinging pressure = 5 kg/cm², and nozzle diameter = 1.5 mm.

The advance of the glass ribbon 3 is performed by the action of delivery roll 4. The glass ribbon which has been sufficiently stretched by jets of the molten metal from nozzles 2 is effectively cooled from the upper surface thereof by means of coolers 5 provided above the molten bath and across the direction of advance of the glass ribbon. Thus the glass ribbon is solidified and allowed to advance over the bath while remaining at a constant width. The molten metal to be jetted from nozzles 2 is introduced to nozzles 2 from bath 1 by forwarding molten metal contained in bath 1 to a compressor, for instance, pump 6, and passing the same through conduits 7 to nozzles 2. A plurality of nozzles 2a, 2b, 2c for imparting a lateral stretching force to the lower portion of the side edge of the glass ribbon by impingement of jets of molten metal are disposed, as is shown in the drawings, in alignment along both side edges of the glass ribbon.

According to the process of this invention, the glass ribbon is gradually stretched laterally and longitudinally while it is still in the plasticized state and there can be prepared a glass ribbon having a uniform and sufficient width and a thickness smaller than the equilibrium thickness. The thickness of the glass ribbon obtained in the above-mentioned embodiment is about 2 mm.

Figure 4:
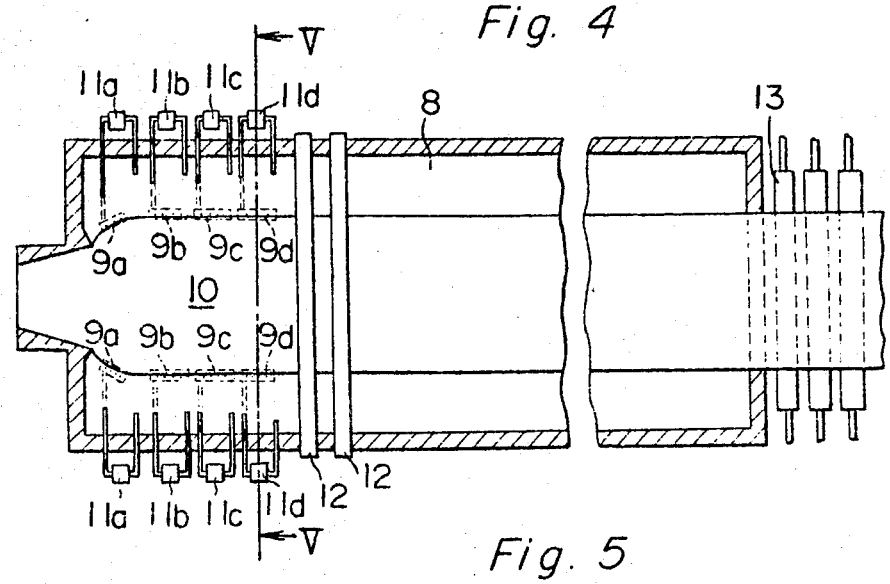
FIG. 4 is a plan view illustrating another embodiment of this invention.
Figure 5:
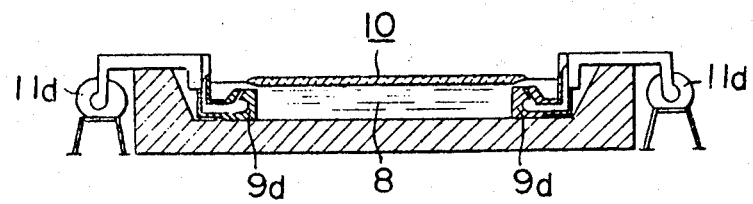
FIG. 5 is a side view illustrating the horizontal section taken along the line B-B' of FIG. 4.

FIGS. 4 and 5 illustrate an embodiment where a glass ribbon having a thickness greater than the equilibrium thickness is produced. In this embodiment, when molten glass flown onto bath 8 of molten tin expands freely on bath 8 to form a ribbon having a certain thickness, a force restricting the expansion is imparted to the lower surface of the glass ribbon at its side edge portions. More specifically, first nozzles 9a disposed in bath 8 impinge laterally inwardly directed jets of molten metal against the lower surface of glass ribbon 10 at a temperature of about 950° C. at both side edge portions, whereby the expansion of the molten glass is inhibited. Subsequently, the width of glass ribbon 10 maintained at 900°–1,000° C. is restricted by second, third and fourth nozzles 9b, 9c and 9d and in this state the glass ribbon is allowed to advance over bath 8. The impinging pressure of these nozzles is adjusted by means of compressors 11a, 11b, 11c and 11d.

The conditions under which the impinging jets of molten metal are operated the same as in the above-mentioned embodiment except that the angle of the jet of the molten metal is 45° inwardly with respect to the lateral direction of the glass ribbon and the distance $d$ is 50 mm.

The glass ribbon 10 the width of which has been restricted to give it a prescribed thickness and which is advancing over bath 8 is cooled from the upper surface thereof by means of coolers 12 disposed above the molten metal bath, and while it is allowed to advance on bath 8, the entire thickness of the glass ribbon is cooled and solidified. Thus the glass ribbon having the intended thickness is withdrawn from bath 8 by means of delivery roll 13. The thickness of the glass ribbon obtained in this embodiment is about 10 mm.

Unlike the conventional process in which the side edges of the glass ribbon are directly contacted with rotary members or the like, the process of this invention can achieve the object of this invention without contacting the glass ribbon with such rotary members. Accordingly, in the process of this invention, adherence of the glass ribbon to such members is not caused to occur and no defects remain on the cooled and solidified glass ribbon. Further, as compared with the process where jets of fluid are impinged against the upper surface of the glass ribbon, the process of this invention is advantageous in that since the momentum of the molten metal impinged on the ribbon is much greater than that of gaseous fluid, the width of the glass ribbon is restricted very efficiently. It is another advantage of this invention that since the liquid surface of the molten metal bath is maintained at the substantially same level, a flat glass ribbon having a uniform thickness different from the equilibrium thickness can be easily prepared.

What we claim is:

1. In a float process for the manufacture of glass ribbon having a thickness different from the equilibrium thickness, comprising flowing molten glass onto a bath of molten metal, forwarding the glass over the bath in the form of a continuous ribbon, cooling and solidifying the glass ribbon, and withdrawing the solidified glass ribbon from the bath, the improvement comprising jetting molten metal toward both side edge portions of the glass ribbon from nozzles disposed below the glass ribbon and in the molten metal bath while the glass ribbon is still in the plasticized state, and in a direction laterally of the glass ribbon and at a pressure sufficient to cause the jets to impinge on the glass ribbon and apply a lateral force to the glass ribbon by the impulse of the molten metal impinging from the nozzles against the side edge portions of the glass ribbon, and withdrawing molten metal from the bath supporting the glass ribbon and supplying it to the nozzles to form the jets of molten metal.

2. The improvement as claimed in claim 1, wherein the molten metal of the jets is maintained at 900°–1,000° C. and is jetted at a rate of 1,000–10,000 g/min per nozzle at a pressure of 1–10 kg/cm$^2$ and from a distance from the glass ribbon of from 5–20 mm, the glass ribbon being maintained at a temperature ranging from 900° to 1,000° C.

3. The improvement as claimed in claim 2, wherein the jets of the molten metal are directed laterally outwardly of the glass ribbon from a distance and at an angle to the plane of the glass ribbon such that the distance between the side edge of the glass ribbon and the point at which an extension of the line of direction of the jet of the molten metal intersects the glass ribbon is in the range of 100–200 mm.

4. The improvement as claimed in claim 2, wherein the jets of the molten metal are directed laterally inwardly of the glass ribbon from a distance and at an angle to the plane of the glass ribbon such that the distance between the side edge of the glass ribbon and the point at which an extension of the line of direction of the jet of the molten metal intersects the glass ribbon is in the range of 50–200 mm.

5. In a float process for the manufacture of glass ribbon having a thickness different from the equilibrium thickness, comprising flowing molten glass onto a bath of molten metal, forwarding the glass over the bath in the form of a continuous ribbon, cooling and solidifying the glass ribbon, and withdrawing the solidified glass ribbon from the bath, the improvement comprising jetting molten metal toward both side edge portions of the glass ribbon from nozzles disposed below the glass ribbon and in the molten metal bath while the glass ribbon is still in the plasticized state, and in a direction laterally outwardly of the glass ribbon and at a pressure sufficient to cause the jets to impinge on the glass ribbon and apply a lateral outward stretching force to the glass ribbon by the impulse of the molten metal impinging from the nozzles against the side edge portions of the glass ribbon, and withdrawing molten metal from the bath supporting the glass ribbon and supplying it to the nozzles to form the jets of molten metal.

6. The improvement as claimed in claim 5, wherein the molten metal of the jets is maintained at 900°–1,000° C. and is jetted at a rate of 1,000–10,000 g/min per nozzle at a pressure of 1–10 kg/cm$^2$ and from a distance from the glass ribbon of from 5–20 mm, the glass ribbon being maintained at a temperature ranging from 900° to 1,000° C., the jets being directed at the glass ribbon from a distance and at an angle to the plane of the glass ribbon such that the distance between the side edge of the glass ribbon and the point at which an extension of the line of direction of the jet of the molten metal intersects the glass ribbon is in the range of 100–200 mm.

7. In a float process for the manufacture of glass ribbon having a thickness different from the equilibrium thickness, comprising flowing molten glass onto a bath of molten metal, forwarding the glass over the bath in the form of a continuous ribbon, cooling and solidifying the glass ribbon, and withdrawing the solidified glass ribbon from the bath, the improvement comprising jetting molten metal toward both side edge portions of the glass ribbon from nozzles disposed below the glass ribbon and in the molten metal bath while the glass ribbon is still in the plasticized state, and in a direction laterally inwardly of the glass ribbon and at a pressure sufficient to cause the jets to impinge on the glass ribbon and apply a lateral inward confining force to the glass ribbon by the impulse of the molten metal impinging from the nozzles against the side edge portions of the glass ribbon, and withdrawing molten metal from the bath supporting the glass ribbon and supplying it to the nozzles to form the jets of molten metal.

8. The improvement as claimed in claim 7, wherein the molten metal of the jets is maintained at 900–1,000 C. and is jetted at a rate of 1,000–10,000 g/min per nozzle at a pressure of 1–10 kg/cm$^2$ and from a distance from the glass ribbon of from 5–20 mm, the glass ribbon being maintained at a temperature ranging from 900° to 1,000° C., the jets being directed at the glass ribbon from a distance and at an angle to the plane of the glass ribbon such that the distance between the side edge of the glass ribbon and the point at which an extension of the line of direction of the jet of the molten metal intersects the glass ribbon is in the range of 50–200 mm.

* * * * *